Patented Mar. 25, 1952

2,590,140

UNITED STATES PATENT OFFICE 2,590,140

PREPARATION OF CRYSTALLINE DIHYDRO-STREPTOMYCIN SESQUISULFATE

Frank J. Wolf, Westfield, N. J., assignor to Merck & Co., Inc., Rahway, N. J., a corporation of New Jersey No Drawing. Application January 13, 1949, Serial No. 70,807

7 Claims. (Cl. 260—210)

This invention relates to a new superior clinical form of streptomycin and to methods for preparing the same. More particularly, the invention relates to crystalline dihydrostreptomycin sulfate, and to procedures for preparing the same from amorphous dihydrostreptomycin sulfate and by metathesis from other acid salts of dihydrostreptomycin.

While the therapeutic value of dihydrostreptomycin sulfate has been recognized for some time, difficulty has been experienced in obtaining a pure product. It is evident that crystalline dihydrostreptomycin sulfate would be distinctly advantageous in providing a product of maximum purity and minimum toxicity, as well as in facilitating standardization of the product in distribution and use. It has heretofore been impossible, however, to prepare dihydrostreptomycin sulfate in crystalline form.

It has now been discovered that by proper selection of solvents and control of procedure, crystallization can be induced from aqueous solutions made up with amorphous dihydrostreptomycin sulfate. While it is difficult to obtain the first crystals of dihydrostreptomycin sulfate, it is found that with seed crystals available further crystallizations can readily be carried out from suitable solvent mixtures.

The pure crystalline product thus obtained is a superior product for clinical injection and produces none of the toxic effects, manifested in pain following injection, which are normally experienced with available streptomycin and dihydrostreptomycin preparations.

In the experiment which yielded the first crystalline dihydrostreptomycin sulfate, a quantity of highly purified amorphous dihydrostreptomycin sulfate was dissolved in water and adjusted to a concentration of 20 gm. per 100 cc. of solution. The pH was then adjusted to 4.5 by addition of dilute sulfuric acid. Quantities of the master solution thus prepared were then diluted with water to produce solutions containing 10, 5, 2 and 1 gm. per 100 cc. A sample of each of these solutions was diluted in a test tube with methanol until turbid and set aside. The second set was similarly diluted with acetone until turbid. After about eight hours all tubes were scratched. Twenty-four hours later, the tubes containing acetone showed no change, but the tubes diluted with methanol contained crystals which were isolated and found to be crystalline dihydrostreptomycin sulfate.

It has since been found that it is possible to prepare initial crystals by employing ethanol or isopropanol to induce crystallization, but the results with methanol are by far the most favorable.

After prepartion of the first crystals, additional quantities of crystalline dihydrostreptomycin sulfate can be prepared in accordance with the present invention by seeding certain aqueous-organic solvent mixtures containing dihydrostreptomycin sulfate. For best results the solution should have a pH of about 4.5, and if necessary the pH may be adjusted by addition of acid such as dilute sulfuric acid.

The organic solvent which is most suitable for inducing crystallization of dihydrostreptomycin sulfate when seed crystals are available is methanol. Other suitable solvents include acetone and water miscible solvents in which the solubility of dihydrostreptomycin sulfate (and hydrochloride) is at least as great as in acetone, as for example, ethanol, isopropanol, and ethylene glycol. (The relative solubility of dihydrostreptomycin sulfate in different solvents corresponds generally to the relative solubility of the hydrochloride in said solvents. Since the degree of solubility of the hydrochloride is considerably greater than than the sulfate, however, it is easier to determine comparative solubilities using the hydrochloride.)

The amount of organic solvent to employ varies with the concentration of dihydrostreptomycin sulfate in the aqueous solution, but may be generally referred to as the amount required to form a slightly supersaturated solution. With some solvents, notably acetone and the lower alkyl alcohols, the appearance of a faint turbidity in the solution indicates when the proper degree of supersaturation has been reached. Addition of too much solvent will cause precipitation of the sulfate in amorphous form, but such a precipitate can readily be redissolved by adding water to compensate for the excess solvent present. Since redissolving the undesired amorphous precipitate is time consuming, and hence objectionable in large scale production, it is preferable to test a small sample of solution with the selected solvent to ascertain the maximum amount of solvent that can be added without precipitating amorphous sulfate, and then to add to the batch an amount of solvent equal to about 90% of the maximum amount thus determined.

It should further be noted that as crystallization of dihydrostreptomycin progresses it is necessary, if maximum recovery of crystalline product is desired, to add more solvent from time to time to maintain the solution in a substantially saturated or slightly supersaturated state with respect to dihydrostreptomycin sulfate.

The starting solution of dihydrostreptomycin sulfate can be prepared by merely dissolving in water amorphous dihydrostreptomycin sulfate obtained either by hydrogenation of other streptomycin salts such as the hydrochloride, and subsequent conversion of the corresponding dihydrostreptomycin salt to the sulfate. If the dihydrostreptomycin sulfate is obtained in processing as an aqueous solution, this may be used directly without intermediate separation of solid amorphous product.

Alternatively, the solution of dihydrostreptomycin sulfate may be formed in situ by a metathetical reaction between another salt of dihydrostreptomycin and a sulfuric acid salt. Any salt of dihydrostreptomycin having moderate solubility in the aqueous solvent mixture used for crystallization may be employed, as for example the acetate, formate, nitrate, hydrobromide, hydrochloride and tartrate salts of dihydrostreptomycin. The primary requirement with respect to the sulfuric acid salt employed is that both the sulfuric acid salt, and the reaction product of the cation of said salt with the anion of the starting dihydrostreptomycin acid salt, be more soluble than dihydrostreptomycin sulfate in the solvent mixture employed. Suitable sulfuric acid salts include ammonium sulfate, alkyl amine sulfates such as dimethyl amine sulfate, and alkylol amine sulfates such as triethanolamine sulfate. As a practical matter, however, upon the basis of ease of preparation and availability, the hydrochloride salt of dihydrostreptomycin and ammonium sulfate are probably the most useful compounds to employ in this metathesis reaction.

In the metathesis above-described, the pH should be about 4.5, and it is necessary that seed crystals of dihydrostreptomycin sulfate be present in the reaction mixture in order for the reaction to go in the desired direction. This driving force induced by the presence of seed crystals in the reaction mixture appears to be due to the relatively low solubility of dihydrostreptomycin sulfate crystals, which results in removal of dihydrostreptomycin sulfate from the reaction mixture as it is formed in the metathesis. It should be noted in this connection that amorphous dihydrostreptomycin sulfate is 50 to 100 times more soluble in water and aqueous-organic solvent mixtures than is the crystalline product.

It will be understood that both the metathesis and the crystallization of dihydrostreptomycin sulfate from aqueous solutions prepared from amorphous product can be carried out under sterile conditions, in which event, the crystalline product can be recovered directly in a form suitable for clinical use.

The pharmacological advantage of reduced toxicity in the resulting crystalline dihydrostreptomycin sulfate is probably due in large part to the high purity of the product. In the crystallization procedures, impurities such as the sulfate salts of streptomycin, mannisidostreptomycin and dihydromannisidostreptomycin do not crystallize under the conditions used for the crystallization of dihydrostreptomycin sulfate. In addition, other impurities and decomposition products are soluble in the solvent mixture, and are consequently removed from the crystalline product.

In addition to providing an improved clinical form of dihydrostreptomycin in the crystalline product, the crystallization procedures represent a major improvement over existing methods for recovering amorphous product, particularly in eliminating the necessity of removing large quantities of water by costly procedures of freeze-drying or low temperature evaporation.

It is to be understood that the new crystalline product as disclosed and claimed herein is crystalline dihydrostreptomycin sesqui-sulfate, i. e., an acid addition salt containing one and one-half moles of sulfuric acid per mole of dihydrostreptomycin and having the empirical formula $(C_{21}H_{41}O_{12}N_7)_2 \cdot 3H_2SO_4$.

The X-ray diffraction pattern of a sample of crystalline dihydrostreptomycin sulfate is tabulated below indicating the spacings and relative intensities as measured by a "Norelco" Geiger-counter spectrometer.

X-ray diffraction

| Spacing, Å | Relative Intensity, Percent |
| --- | --- |
| 8.74 | 50 |
| 8.09 | 35 |
| 7.64 | 40 |
| 6.81 | 35 |
| 6.32 | 25 |
| 5.62 | 40 |
| 5.35 | 60 |
| 4.78 | 85 |
| 4.70 | 85 |
| 4.32 | 60 |
| 4.13 | 50 |
| 4.07 | 45 |
| 3.81 | 30 |
| 3.69 | 50 |
| 3.62 | 75 |
| 3.42 | 100 |
| 3.19 | 25 |
| 3.14 | 40 |
| 2.95 | 25 |

The other crystalline characteristics are as follows:

Refractive indices $\alpha = 1.552 \pm .002$
$\beta = 1.558 \pm .004$
$\gamma = 1.566 \pm .002$ Extinction angle 18°.

The following examples show how procedures for the preparation of crystalline dihydrostreptomycin sulfate in accordance with the present invention can be carried out, but it is to be understood that these examples are given by way of illustration and not of limitation.

Example 1

A sample of highly purified but amorphous dihydrostreptomycin sulfate was dissolved in water and the pH of the solution adjusted to pH 4.5 by adding a small amount of dilute sulfuric acid. The volume of the resultant solution was adjusted in such a fashion that 20 g. of the product was dissolved in 100 cc. of solution. Part of the master solution was then diluted to produce solutions containing 10, 5, 2 and 1 g. per 100 cc. A small sample of each of these solutions was diluted in a test tube with methanol until turbid and set aside. A second set was prepared and diluted with acetone. After about eight hours had elapsed all tubes were scratched. Twenty-four hours later, all of the tubes containing methanol contained crystalline dihydrostreptomycin sulfate.

Analysis: Calcd: C, 34.42; H, 6.05; N, 13.38; S, 6.56. Found: C, 34.26; H, 6.32; N, 13.27; S, 6.59.

Example 2

A solution of 60 g. of amorphous dihydrostreptomycinsulfate was adjusted to pH 4.5 with dilute sulfuric acid and the volume adjusted to 300 cc. Methanol was added to the solution until a faint turbidity persisted (175 cc. was required). One gram of crystalline dihydrostreptomycin sulfate was then added and the mixture was stirred four hours, during which time crystalline dihydrostreptomycin sulfate separated from the solution. At this time a sample of the supernatant liquid was removed and methanol was added until a faint turbidity existed. This required 34% of its volume of methanol indicating that 160 cc. of methanol could be added without precipitating amorphous dihydrostreptomycin sulfate. To the mixture was added 140 cc. of methanol (about 90% of the tolerance), and stirring continued at room temperature for 18 hours. At the end of this time a sample of the supernatant liquor was removed and evaporated to dryness. The weight obtained, 1.7 mg. per cc., indicated that 0.95 g. or 1.6% of the original solid remained in the mother liquor. The mixture was filtered and the product washed on the funnel with one 100 cc. portion of 50–50 methanol-water and five 100 cc. portions of methanol, and dried in vacuo. The weight of product obtained was 58 g.

The concentrations cited in the foregoing example are not critical. It will be understood that by varying the concentration of dihydrostreptomycin sulfate in water and the proportion of methanol added that equally high yields of crystalline product may be obtained under a wide range of conditions. The primary factor to bear in mind is that the amount of methanol should not exceed the amount necessary to produce a faint turbidity. This amount will, of course, vary with each batch depending upon the actual concentration of dihydrostreptomycin sulfate in the starting solution.

The foregoing procedure has been repeated using as solvent each of the following: isopropanol, ethanol and acetone. Different amounts of these solvents are, of course, necessary to bring the solution to supersaturation (or turbidity), but in each instance seeding and permitting the solution to stand with agitation resulted in good yields of crystalline product.

Example 3

To a solution of triethanolamine in methanol was added sulfuric acid to a pH of about 4.5. The resultant solution contained about 0.1 equivalent of triethanolamine sulfate per 100 cc.

To a solution of 90.5 g. of dihydrostreptomycin hydrochloride in 460 cc. of water was added 143 cc. of triethanolamine sulfate solution. The mixture was seeded with crystalline dihydrostreptomycin sulfate and 200 ml. of methanol was added. The mixture was stirred for forty-eight hours and an additional 286 cc. of the triethanolamine sulfate was added. The mixture was stirred an additional 48 hours and filtered and washed with methanol. The dried product, crystalline dihydrostreptomycin sulfate, weighed 80.5 g.

$2C_{21}H_{41}O_{12}N_7 \cdot 3HCl +$
$3[(HOCH_2CH_2)_3N]_2 \cdot H_2SO_4 + \text{seed crystals} \rightarrow$
$(C_{21}H_{41}O_{12}N_7)_2 \cdot 3H_2SO_4 + 6(HOCH_2CH_2)_3N \cdot HCl$

Example 4

A water solution of dihydrostreptomycin hydrochloride was prepared by reducing streptomycin calcium chloride double salt in water solution with hydrogen in the presence of Adam's catalyst (platinum oxide), filtering from the catalyst, treating the resultant solution with silver carbonate to effect removal of calcium chloride and filtering from the resultant silver chloride, calcium carbonate mixture. The solution obtained was adjusted to pH 4.5 with hydrochloric acid. A total solids assay indicated a concentration of 377 mg. of dihydrostreptomycin hydrochloride per cc. of solution.

A water solution of triethanolamine sulfate was prepared by adding a 50% water solution of sulfuric acid to a 50% water solution of triethanolamine. The resultant solution contained 2.2 equivalents per liter.

To 300 cc. of the dihydrostreptomycin solution containing 113 g. (0.163 mole) of dihydrostreptomycin hydrochloride was added 250 cc. of triethanolamine sulfate solution containing 0.55 equivalents of triethanolamine (3.37 equivalents per mole of dihydrostreptomycin) and 540 cc. of methanol. The mixture was seeded with crystalline dihydrostreptomycin sulfate and allowed to stir for four hours. A sample of the supernatant liquor was removed and was found to tolerate 62% of its volume of methanol before becoming turbid. Six hundred cc. of methanol (89% of the tolerated volume) was added and stirring continued for an additional twelve hours. At the end of this time an optical rotation of the supernatant liquor indicated that the residual concentration of dihydrostreptomycin was 1.7 mg. per cc. or a crystallization yield of 97.5%. The product was filtered, washed with 50–50 methanol-water then methanol and dried. The weight of product obtained was 119.6 g. or 380 mg. per cc. of starting solution.

Example 5

$2C_{21}H_{41}O_{12}N_7 \cdot 3HCl + 3(NH_4)_2SO_4 + \text{seed crystals}$
$\rightarrow [C_{21}H_{41}O_{12}N_7]_2[H_2SO_4]_3 + 6NH_4Cl$ The rich liquor of dihydrostreptomycin hydrochloride after the silver carbonate treatment step as shown in Example 4, is adjusted to pH 4.5–4.7 and 30.0 g. of ammonium sulfate per 100 g. of dihydrostreptomycin hydrochloride is added to the solution. After the ammonium sulfate has dissolved, the solution is treated with activated charcoal. After filtration the volume of the filtrate is adjusted with water to the concentration of 200 mg. of dihydrostreptomycin hydrochloride per cc. of solution. Methanol is added gradually to the mixture until a faint turbidity remains, usually requiring an equal volume of solvent. Seed crystals of dihydrostreptomycin sulfate are added in the amount of 2% of the weight of the dihydrostreptomycin charged. The mixture is stirred for six to eight hours. Methanol is added until the total volume of methanol added is equal to 1½ times the volume of the 20% aqueous solution. The crystallized dihydrostreptomycin sulfate is removed by centrifugation and washed with a 50–50 methanol-water solution followed by a methanol wash. The product is dried in vacuo at 60° C.

Example 6

As described in Example 4, the procedure was repeated using 5,379 cc. of the dihydrostreptomycin hydrochloride solution and 4,120 cc. of a triethanolamine sulfate solution containing 10.5 equivalents of triethanolamine sulfate (3.72 equivalents per mole of dihydrostreptomycin). A total of 19 liters of methanol was added in two equal parts. The product was filtered on a basket centrifuge and washed with 4 liters of 50–50 methanol-water and 4 liters of methanol and dried. The weight of product, 2,130 g., corresponds to 376 mg. per cc. of the original starting solution. Correcting for 5% volatile constituents, the yield is 93% based on the original total solids assay of the solution.

This procedure is also amenable to the preparation of sterile crystalline dihydrostreptomycin sulfate providing the proper precautions are taken in handling the solutions and the product. The preparation of crystalline dihydrostreptomycin sulfate of high purity is thus possible directly from streptomycin calcium chloride double salt by using only three steps, namely, reduction; removal of calcium chloride; and crystallization.

It will also be understood that the concentrations of dihydrostreptomycin in water and methanol may be varied within wide limits without seriously affecting the practical operation of the procedure.

*Example 7*

A solution of 20 g. of dihydrostreptomycin hidrochloride in 100 cc. of water was prepared. To the solution was added 8 g. of dimethylamine and the solution immediately neutralized to pH 4.7 with sulfuric acid. The solution was diluted with methanol until turbid (110 cc. required), seeded with crystalline dihydrostreptomycin sulfate and stirred. After 12 hours an additional 110 cc. portion of methanol was added. Four hours later the clear supernatant liquor was assayed indicating greater than 90% crystallization. The product was filtered, washed with 80% methanol-20% water then methanol and dried in vacuo. Weight, 19–20 g. (90–95% yield).

It has been found that after a number of crystallizations of dihydrostreptomycin sulfate have been carried out in a particular environment, crystallization of additional amounts of dihydrostreptomycin sulfate can sometimes be effected without the actual addition of seed crystals. This is probably due to the presence in the apparatus or atmosphere of minute crystals of dihydrostreptomycin sulfate. In order to provide optimum control of the crystallization and to effect crystallization in the shortest time, it is preferable, however, to add crystals to the supersaturated solution rather than to rely on the seeding action of minute crystals in the environment.

Various changes and modifications in the foregoing procedures will occur to those versed in the art, and to the extent that such changes and modifications are embraced by the appended claims, it is to be understood that they constitute part of my invention.

I claim:

1. The process for preparing crystalline dihydrostreptomycin sesqui-sulfate that comprises dissolving a quantity of highly purified amorphous dihydrostreptomycin sulfate in water, acidifying the resulting solution to a pH of about 4.5 by addition of sulfuric acid, adjusting the resulting solution to a concentration of approximately 1 to 10 gm. of dihydrostreptomycin sulfate per 100 cc. of solution, adding to the dilute solution a quantity of methanol merely sufficient to produce a faint turbidity in the solution, and permitting the turbid solution to stand until crystals of dihydrostreptomycin sesqui-sulfate form therein.

2. The process for preparing crystalline dihydrostreptomycin sesqui-sulfate that comprises dissolving a quantity of highly purified amorphous dihydrostreptomycin sulfate in water, acidifying the resulting solution to a pH of about 4.5 by addition of sulfuric acid, diluting the resulting solution to a concentration of approximately 1 to 10 gm. of dihydrostreptomycin sulfate per 100 cc. of solution, adding to the dilute solution a quantity of methanol merely sufficient to produce a faint turbidity in the solution, permitting the turbid solution to stand until crystals of dihydrostreptomycin sesqui-sulfate form therein, and utilizing the crystals thus obtained for seeding a supersaturated aqueous-organic solvent solution of dihydrostreptomycin sulfate, in the quantity production of crystalline dihydrostreptomycin sesqui-sulfate.

3. The process as defined in claim 2 wherein the supersaturated solution is prepared by acidifying an aqueous solution of dihydrostreptomycin sulfate to a pH of about 4.5, and adding thereto, in an amount sufficient to form a supersaturated solution, a water miscible organic solvent in which dihydrostreptomycin sulfate is at least as soluble as in acetone.

4. The process as defined in claim 2 wherein the supersaturated solution is prepared by acidifying an aqueous solution of dihydrostreptomycin sulfate to a pH of about 4.5, and adding methanol thereto in an amount sufficient to produce a supersaturated solution.

5. The process as defined in claim 2 wherein the supersaturated solution is prepared by acidifying an aqueous solution of dihydrostreptomycin sulfate to a pH of about 4.5, and adding ethanol thereto in an amount sufficient to produce a supersaturated solution.

6. The process as defined in claim 2 wherein the supersaturated solution is prepared by acidifying an aqueous solution of dihydrostreptomycin sulfate to a pH of about 4.5, and adding isopropanol thereto in an amount sufficient to produce a supersaturated solution.

7. The process as defined in claim 2 wherein the supersaturated solution is prepared by acidifying an aqueous solution of dihydrostreptomycin sulfate to a pH of about 4.5, and adding acetone thereto in an amount sufficient to produce a supersaturated solution.

FRANK J. WOLF.

REFERENCES CITED

The following references are of record in the file of this patent:

UNITED STATES PATENTS

| Number | Name | Date |
| --- | --- | --- |
| 2,446,102 | Peck | July 27, 1948 |
| 2,462,175 | Folkers | Feb. 22, 1949 |
| 2,498,574 | Peck | Feb. 21, 1950 |

OTHER REFERENCES

Norris, "Experimental Organic Chemistry," sec. ed., 1924, pp. 3–8, 6 pages.

Donovick et al., J. Bact., v. 53 (1947), p. 207.

Science, v. 109 (1949), pp. 515–516, 2 pages.